(12) United States Patent
Chen (10) Patent No.: US 11,165,367 B2
(45) Date of Patent: Nov. 2, 2021

(54) SINGLE-STAGE THREE-PHASE VOLTAGE SOURCE INVERTER WITH A CASCADED MAGNETIC INTEGRATED SWITCHING INDUCTOR-CAPACITOR NETWORK

(71) Applicant: Qingdao University, Qingdao (CN)

(72) Inventor: Daolian Chen, Qingdao (CN)

(73) Assignee: QINGDAO UNIVERSITY, Qingdao (CN)

( * ) Notice: Subject to any disclaimer, the term of this patent is extended or adjusted under 35 U.S.C. 154(b) by 0 days.

(21) Appl. No.: 16/622,281

(22) PCT Filed: Dec. 6, 2018

(86) PCT No.: PCT/CN2018/000412
§ 371 (c)(1),
(2) Date: Dec. 12, 2019

(87) PCT Pub. No.: WO2019/136578
PCT Pub. Date: Jul. 18, 2019

(65) Prior Publication Data
US 2020/0106370 A1    Apr. 2, 2020

(30) Foreign Application Priority Data
Jan. 9, 2018 (CN) .......................... 201810019184.4

(51) Int. Cl.
*H02M 7/5387* (2007.01)
*H02J 3/38* (2006.01)
*H02M 1/14* (2006.01)

(52) U.S. Cl.
CPC ......... *H02M 7/53871* (2013.01); *H02J 3/381* (2013.01); *H02M 1/14* (2013.01); *H02J 2300/20* (2020.01)

(58) Field of Classification Search
CPC .... H02M 7/53871; H02M 7/48; H02M 1/007; H02M 1/14; H02M 1/0064; H02M 7/003;
(Continued)

(56) References Cited

U.S. PATENT DOCUMENTS 5,434,770 A * 7/1995 Dreifuerst ............... H02J 1/102
363/136
5,587,892 A * 12/1996 Barrett ................... H02M 3/337
363/44

(Continued)

FOREIGN PATENT DOCUMENTS

| CN | 103532361 A | 1/2014 |
|---|---|---|
| CN | 108199597 A | 6/2018 |

OTHER PUBLICATIONS

Ji Xiaoxiong, Research on High Boost Ratio Switching Inductor Quasi-Z Source Inverter, Engineering Science and Technology II, China Master's Theses Full Text Database (Electronic Journals), Feb. 15, 2016, No. 2.

(Continued)

*Primary Examiner* — Kyle J Moody
(74) *Attorney, Agent, or Firm* — Bayramoglu L.aw Offices LLC (57) ABSTRACT

A single-stage three-phase voltage source inverter circuit structure with a cascaded magnetic integrated switching inductor-capacitor network includes an input DC power supply, a magnetic integrated switching inductor-capacitor network, a three-phase inverter bridge, a three-phase filter, a three-phase AC load or a three-phase AC grid successively connected in cascade. The magnetic integrated switching inductor-capacitor network includes an energy storage inductor, and two identical SLCC type two-port switching inductor-capacitor network units which are successively connected in cascade and connected in series. A magnetic integration structure of the three energy storage inductors is (Continued)

configured to have magnetic coupling of the three inductors, magnetic decoupling of the three inductors, or magnetic coupling of each inductor with the other two inductors, which are respectively realized by an EE type magnetic core, a four-leg type magnetic core, and an EE type magnetic core.

4 Claims, 8 Drawing Sheets

(58) Field of Classification Search
CPC ........ H02M 1/126; Y02E 10/56; Y02A 30/60; H02J 3/383; H02J 3/381; H02J 2300/20; H02J 2300/30
See application file for complete search history.

(56) References Cited

U.S. PATENT DOCUMENTS

| | | | |
|---|---|---|---|
| 10,833,600 B2 * | 11/2020 | Chen | H02M 7/4807 |
| 11,050,359 B2 * | 6/2021 | Chen | H02M 1/126 |
| 2007/0114979 A1 | 5/2007 | Chandrasekaran | |
| 2020/0136524 A1 * | 4/2020 | Chen | H02M 7/53871 |

OTHER PUBLICATIONS

Chen Qianhong, et al., The Application of the Magnetic-integration Techniques in Switching Power Supply, Transactions of China Electrotechnical Society, Mar. 30, 2004, vol. 19, No. 3, Nanjing China.

Qu Aiwen, et al., Novel Single-stage Three-phase Voltage-fed Quasi-Z-source Photovoltaic Grid-connected Inverter, Proceedings of the CSEE, Apr. 5, 2017, pp. 2091-2101, vol. 37, No. 7, Fujian Province, China.

* cited by examiner

SINGLE-STAGE THREE-PHASE VOLTAGE SOURCE INVERTER WITH A CASCADED MAGNETIC INTEGRATED SWITCHING INDUCTOR-CAPACITOR NETWORK

CROSS REFERENCE TO THE RELATED APPLICATIONS

This application is the national phase entry of International Application No. PCT/CN2018/000412, filed on Dec. 6, 2018, which is based upon and claims priority to Chinese Patent Application No. 201810019184.4, filed on Jan. 9, 2018, the entire contents of which are incorporated herein by reference.

TECHNICAL FIELD

The present disclosure relates to a single-stage three-phase voltage source inverter with a cascaded magnetic integrated switching inductor-capacitor network and pertains to the technical field of power electronics conversion.

BACKGROUND

The inverter is a static converter that converts direct-current (DC) electricity into alternating-current (AC) electricity by using a power semiconductor device to supply power for an alternating current load or to be grid connected with an alternating current grid for power supply.

With the growing scarcity of fossil energy (non-renewable energy) such as petroleum, coal, and natural gas, serious environmental pollution, global warming, and nuclear waste and environmental pollution caused by nuclear energy production etc., energy and the environmental challenges have become critical issues facing humanity in the 21st century. Renewable energy sources (green energy) such as solar, wind, hydrogen, tide, and geotherm benefit from the advantages of being clean, pollution-free, low-cost, reliable, and having abundant reserves. These benefits have drawn increasing attention in the exploitation and utilization as well as play an important role in the sustainable development of the global economy. The DC electricity converted from the renewable energy sources such as solar, wind, hydrogen, tide and geotherm is usually unstable, so the DC electricity needs to be converted into AC electricity by an inverter for the load to use or to be grid connected with the AC grid for power supply. In occasions where the DC generators, batteries, solar cells, fuel cells and wind turbines, etc., are used for the conversion of the main DC power sources, the inverters have broad prospective applications.

At present, the circuit structure of a conventional three-phase voltage source PWM inverter is usually adopted in the occasions of medium and large capacity inversion. Such type of inverters requires the voltage of the DC side to be greater than the peak value of the line voltage of the AC side to work normally, so there is an obvious defect. When the voltage of the DC side (e.g. the output capability of a photovoltaic cell) decreases, for example, in rainy days or nights, the entire power generation system will be difficult to operate normally and the utilization rate of the system will be reduced. To solve this problem, the following two methods are usually used: (1) add a boost DC converter or high frequency isolated DC-DC converter to the first stage of the circuit of the inverter. By doing so, the power conversion stages, circuit complexity, loss and cost will be increased; (2) add a three-phase power frequency transformer to the output circuit. By doing so, the size, weight and cost of the system will be greatly increased. Thus, this solution is not applicable to the current situation where the prices of copper and iron raw materials continue to increase sharply.

Therefore, there is an urgent need to develop a novel single-stage three-phase voltage source inverter with a cascaded magnetic integrated switching inductor-capacitor network without the need to set a dead time for the inverter leg, while having high reliability and single-stage circuit structure. Also, there is a need to effectively overcome the defects of the conventional PWM converters, where the defects include the need to set a dead time for the inverter leg, not enough step-up ratio (non-isolated type), large size and weight of the system and high cost (by adding a three-phase power frequency transformer to the output circuit), improve the output waveform quality and reliability of the conversion system, reduce the input side EMI, broaden the theory of the inverter technology of the power electronics and the renewable energy power generation technology, promote the development of new energy power generation industry, and develop an energy-saving and economical society.

SUMMARY

The objective of the present disclosure is to provide a single-stage three-phase voltage source inverter with a cascaded magnetic integrated switching inductor-capacitor network characterized by a large step-up ratio, a single-stage power conversion, a high power density, a high conversion efficiency, a high output waveform quality, a high reliability, a wide input voltage variation range, a low cost, and an applicability in the occasions of medium and large capacity inversion.

The technical solution of the present disclosure is as follows. A single-stage three-phase voltage source inverter with a cascaded magnetic integrated switching inductor-capacitor network, includes an input DC power supply, a magnetic integrated switching inductor-capacitor network, a three-phase inverter bridge, a three-phase filter, and a three-phase AC load or a three-phase AC grid. The input DC power supply, the magnetic integrated switching inductor-capacitor network, the three-phase inverter bridge, the three-phase filter, and the three-phase AC load or the three-phase AC grid are successively connected in cascade. The magnetic integrated switching inductor-capacitor network includes an energy storage inductor $L_0$ and two identical SLCC type two-port switching inductor-capacitor network units. The two SLCC type two-port switching inductor-capacitor network units are successively connected in cascade and connected to one another in series. Each SLCC type two-port switching inductor-capacitor network unit includes a power diode $S_j$, an energy storage inductor $L_j$, two energy storage capacitors $C_j$ and $C_j'$. The cathode of the power diode $S_j$ is connected to one end of the energy storage inductor $L_j$ and the positive electrode of the energy storage capacitor $C_j$. The other end of the energy storage inductor $L_j$ and the anode of the power diode $S_j$ are respectively connected to the positive electrode and the negative electrode of the energy storage capacitor $C_j'$. The negative electrode of the energy storage capacitor $C_j$ is connected to the negative electrode of the input DC power supply to form a common end. The connection end of the power diode $S_j$ and the energy storage capacitor $C_j'$ and the common end of the energy storage capacitor $C_j$ constitute an input port of the $j^{th}$ SLCC type two-port switching inductor-capacitor network unit. The connection end of the energy storage inductor $L_j$ and the energy storage capacitor $C_j'$ and the common end of the energy storage capacitor $C_j$ constitute an output port of the $j^{th}$ SLCC type two-port switching inductor-capacitor network unit. The energy storage inductor $L_0$ is serially connected between the connection end of the power diode $S_1$ and the energy storage capacitor $C_1'$ and the positive electrode of the input DC power supply, wherein j=1, 2. The three-phase inverter bridge includes six two-quadrant power switches capable of withstanding unidirectional voltage stress and bidirectional current stress. A magnetic integration structure of the three energy storage inductors $L_0, L_1, L_2$ in the magnetic integrated switching inductor-capacitor network is configured to have a magnetic coupling of the three inductors, a magnetic decoupling of the three inductors, or a magnetic coupling of each inductor with the other two inductors. The mutual inductances between each two of the three energy storage inductors $L_0, L_1, L_2$ are represented by $M_{01}, M_{12}, M_{20}$, respectively. An EE type magnetic core is used to achieve the magnetic coupling structure of the three inductors. The three induction coils are all wound around the center leg with or without an air gap of the magnetic core, and there is no winding on the two side legs with the air gaps of the magnetic core, wherein the mutual inductance is $M_{01}=M_{12}=M_{20}$. A four-leg magnetic core is used to achieve the magnetic decoupling structure of the three inductors. The three induction coils are respectively wound around the three legs with air gaps of the magnetic core and the fourth leg of the magnetic core has no air gap and no winding, wherein the mutual inductance is $M_{01}=M_{12}=M_{20}=0$. An EE type magnetic core is used to achieve the magnetic coupling structure of each inductor with the other two inductors. A half of the induction coil $N_1$ and the induction coil $N_0$ are wound around a side leg with an air gap of the magnetic core. The other half of the induction coil $N_1$ and the induction coil $N_2$ are wound around the other side leg with an air gap of the magnetic core and there is no winding on the center leg with or without an air gap of the magnetic core, wherein the mutual inductance is $M_{01}=M_{12}\gg M_{20}$.

The present disclosure constructs "the circuit structure of a conventional single-stage three-phase PWM converter or the circuit structure of a multi-stage cascaded PWM converter which is constituted by a three-phase inverter bridge, a three-phase filter, and/or a three-phase power frequency transformer connected in cascade" as "a single-stage circuit structure which is constituted by a magnetic integrated switching inductor-capacitor network, a three-phase inverter bridge, and a three-phase filter successively connected in cascade". A new concept and circuit structure of a single-stage three-phase voltage source inverter with cascaded magnetic integrated switching inductor-capacitor network is first proposed. Specifically, by providing two identical SLCC type two-port switching inductor-capacitor network units which are successively connected in cascade. The output of the first-stage SLCC type two-port switching inductor-capacitor network unit is used as the input of the second-stage SLCC type two-port switching inductor-capacitor network unit to increase the step-up ratio of the inverter. The step-up ratio of the inverter is adjusted by increasing the number of stages of the SLCC type two-port switching inductor-capacitor network unit and the magnetizing duty ratio $D_0=T_0/T_S$ of the energy storage inductor of the inverter, wherein $T_S$ is the high frequency switching cycle period and $T_0$ is the shoot-through period of the leg of the three-phase inverter bridge in one cycle period $T_S$.

The present disclosure has the following advantages. The inverter of the present disclosure can convert the unstable low-voltage DC electricity with a wide variation range into stable high-quality three-phase sinusoidal AC electricity in a single-stage power conversion mode, which has the advantages of single-stage power conversion, high power density, high conversion efficiency, large step-up ratio, magnetic integration of three energy storage inductors, high output waveform quality, high reliability, low cost, and is suitable for medium and large-capacity three-phase passive inversion and grid connected inversion.

BRIEF DESCRIPTION OF THE DRAWINGS

FIG. 5 shows a magnetizing equivalent circuit of the energy storage inductors of the single-stage three-phase voltage source inverter with a cascaded magnetic integrated switching inductor-capacitor network during the shoot-through period $D_0T_S$ of the leg—$S_1'$, $S_3'$, $S_5'$, $S_4'$, $S_6'$, $S_2'$ being turned on;

DETAILED DESCRIPTION OF THE EMBODIMENTS

The technical solution of the present disclosure is further described hereinafter with the drawings and embodiments.

A single-stage three-phase voltage source inverter with a cascaded magnetic integrated switching inductor-capacitor network, includes an input DC power supply, a magnetic integrated switching inductor-capacitor network, a three-phase inverter bridge, a three-phase filter, and a three-phase AC load or a three-phase AC grid. The input DC power supply, the magnetic integrated switching inductor-capacitor network, the three-phase inverter bridge, the three-phase filter, and the three-phase AC load or the three-phase AC grid are successively connected in cascade. The magnetic integrated switching inductor-capacitor network includes an energy storage inductor $L_0$ and two identical SLCC type two-port switching inductor-capacitor network units. The two SLCC type two-port switching inductor-capacitor network units are successively connected in cascade and connected to one another in series. Each SLCC type two-port switching inductor-capacitor network unit includes a power diode $S_j$, an energy storage inductor $L_j$, two energy storage capacitors $C_j$ and $C_j'$. The cathode of the power diode $S_j$ is connected to one end of the energy storage inductor $L_j$ and the positive electrode of the energy storage capacitor $C_j'$. The other end of the energy storage inductor $L_j$ and the anode of the power diode $S_j$ are respectively connected to the positive electrode and the negative electrode of the energy storage capacitor $C_j'$. The negative electrode of the energy storage capacitor $C_j$ is connected to the negative electrode of the input DC power supply to form a common end. The connection end of the power diode $S_j$ and the energy storage capacitor $C_j'$ and the common end of the energy storage capacitor $C_j$ constitute an input port of the $j^{th}$ SLCC type two-port switching inductor-capacitor network unit. The connection end of the energy storage inductor $L_j$ and the energy storage capacitor $C_j'$ and the common end of the energy storage capacitor $C_j$ constitute an output port of the $j^{th}$ SLCC type two-port switching inductor-capacitor network unit. The energy storage inductor $L_0$ is serially connected between the connection end of the power diode $S_1$ and the energy storage capacitor $C_1'$ and the positive electrode of the input DC power supply, wherein j=1, 2. The three-phase inverter bridge includes six two-quadrant power switches capable of withstanding unidirectional voltage stress and bidirectional current stress. A magnetic integration structure of the three energy storage inductors $L_0$, $L_1$, $L_2$ in the magnetic integrated switching inductor-capacitor network is configured to have a magnetic coupling of the three inductors, a magnetic decoupling of the three inductors, or a magnetic coupling of each inductor with the other two inductors. The mutual inductances between each two of the three energy storage inductors $L_0$, $L_1$, $L_2$ are represented by $M_{01}$, $M_{12}$, $M_{20}$, respectively. An EE type magnetic core is used to achieve the magnetic coupling structure of the three inductors. The three induction coils are all wound around the center leg with or without an air gap of the magnetic core, and there is no winding on the two side legs with air gaps of the magnetic core, where the mutual inductance is $M_{01}=M_{12}=M_{20}$. A four-leg magnetic core is used to achieve the magnetic decoupling structure of the three inductors and the three induction coils are respectively wound around the three legs with air gaps of the magnetic core. The fourth leg of the magnetic core has no air gap and no winding, where the mutual inductance is $M_{01}=M_{12}=M_{20}=0$. An EE type magnetic core is used to achieve the magnetic coupling structure of each inductor with the other two inductors. A half of the induction coil $N_1$ and the induction coil $N_0$ are wound around a side leg with an air gap of the magnetic core. The other half of the induction coil $N_1$ and the induction coil $N_2$ are wound around the other side leg with an air gap of the magnetic core, and there is no winding on the center leg without or with an air gap of the magnetic core, where the mutual inductance is $M_{01}=M_{12}\gg M_{20}$.

Figure 1:
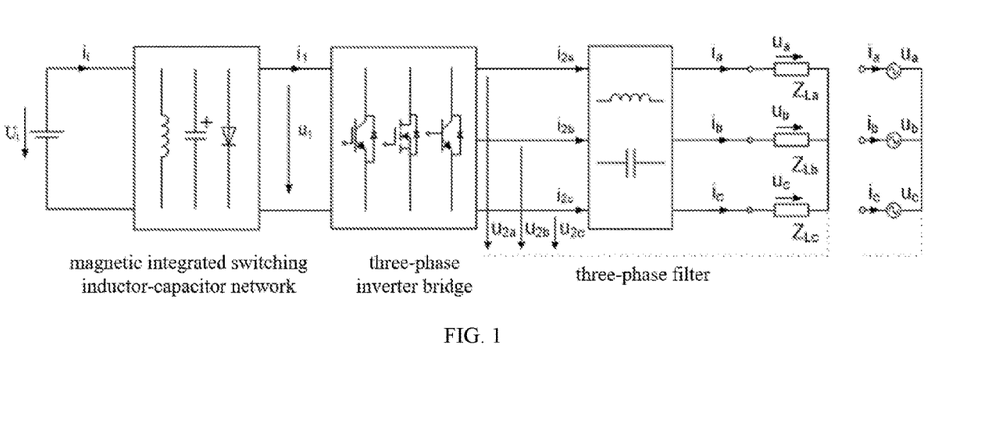
FIG. 1 shows a circuit structure of the single-stage three-phase voltage source inverter with a cascaded magnetic integrated switching inductor-capacitor network.
Figure 2:
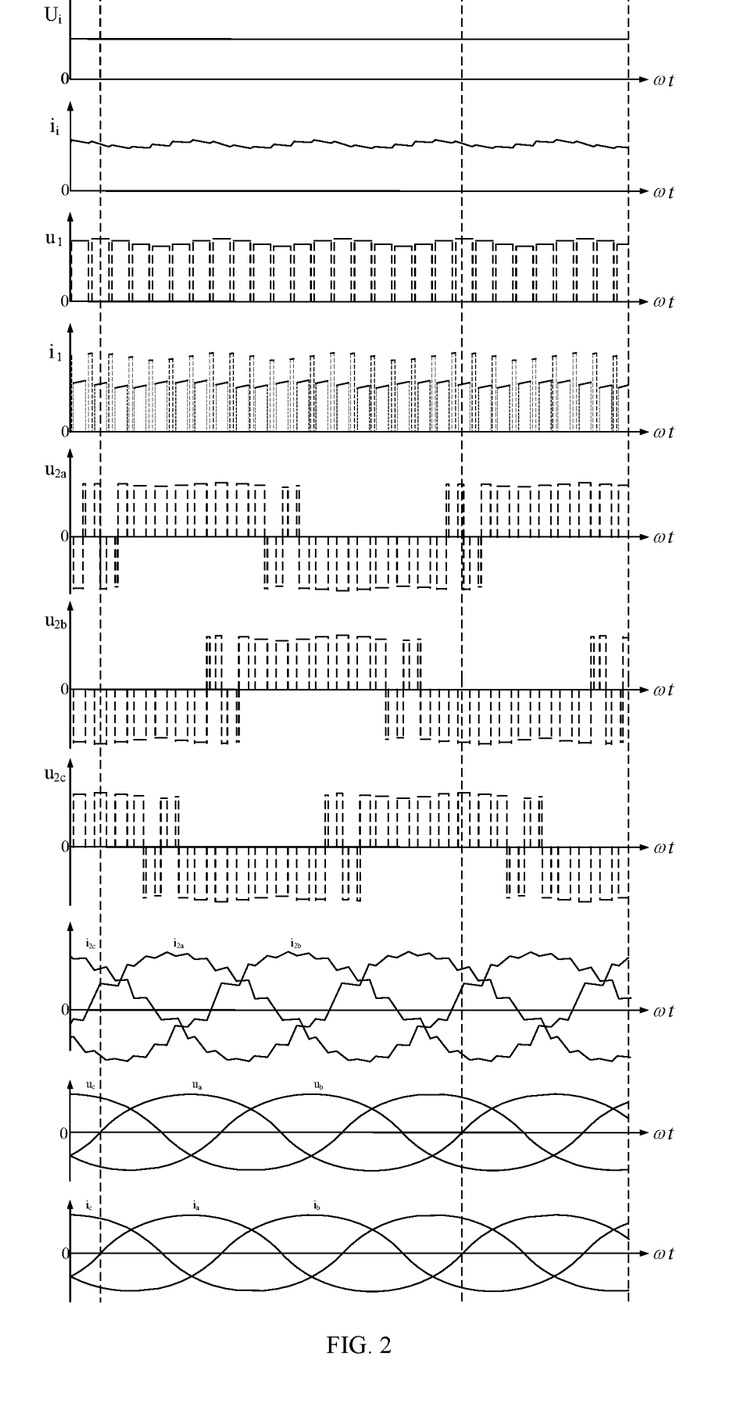
FIG. 2 shows the waveform according to the principle of the single-stage three-phase voltage source inverter with a cascaded magnetic integrated switching inductor-capacitor network.

The circuit structure and waveform diagram according to the principle of the single-phase three-phase voltage source inverter with cascaded magnetic integrated switching inductor-capacitor network are respectively shown in FIGS. 1 and 2. In FIGS. 1 and 2, $U_i$ is the input DC voltage, $Z_{La}$, $Z_{Lb}$, $Z_{Lc}$ are the three-phase output impedance of passive load, $u_a$, $u_b$, $u_c$ are the phase voltage of the three-phase output impedance of passive load or the voltage of the three-phase AC grid, $i_a$, $i_b$, $i_c$ are the phase currents of the three-phase output impedance of passive load or the currents of the three-phase AC grid. The magnetic integrated switching inductor-capacitor network includes an energy storage inductor $L_0$ and two identical SLCC type two-port switching inductor-capacitor network units. The two SLCC type two-port switching inductor-capacitor network units are successively connected in cascade and connected to one another in series. Each SLCC type two-port switching inductor-capacitor network unit includes a power diode $S_j$, an energy storage inductor $L_j$ and two energy storage capacitors $C_j$ and $C_j'$. A magnetic integration structure of the three energy storage inductors $L_0$, $L_1$, $L_2$ in the magnetic integrated switching inductor-capacitor network is configured to have magnetic coupling of the three inductors, a magnetic decoupling of the three inductors, or a magnetic coupling of each inductor with the other two inductors. The three-phase inverter bridge includes six two-quadrant power switches capable of withstanding unidirectional voltage stress and bidirectional current stress. The three-phase filter is a three-phase LC filter (with three-phase AC passive load) or a three-phase LCL filter (with three-phase AC grid load). An input filter may be or may not be arranged between the input DC power supply $U_i$ and the magnetic integrated switching inductor-capacitor network. The input DC current ripple can be reduced by setting the input filter. When in the shoot-through state of the leg of the three-phase inverter, the input DC power source $U_i$ and all the energy storage capacitors magnetize the energy storage inductors $L_0$, $L_1$, $L_2$, and the three-phase output passive load $Z_{La}$, $Z_{Lb}$, $Z_{Lc}$ or the three-phase AC grid $u_a$, $u_b$, $u_c$ rely on the three-phase filter to maintain power supply. When one switch on a leg of the three-phase inverter bridge is turned on and the other switch is turned off, the energy storage inductors $L_0$, $L_1$, $L_2$ are demagnetized and supply power to all the energy storage capacitors, the three-phase output passive load $Z_{La}$, $Z_{Lb}$, $Z_{Lc}$ or the three-phase AC grid $u_a$, $u_b$, $u_c$ together with the input DC power source $U_i$. The magnetic integrated switching inductor-capacitor network and the three-phase inverter bridge modulate the input DC voltage $U_i$ into a high-frequency pulse DC voltage $u_1$ with a uniform pulse width and a regular amplitude variation along the sinusoidal envelope curve of six times the output frequency. The three-phase inverter bridge inverts $u_1$ into three-phase three-state modulation phase voltages $u_{2a}$, $u_{2b}$, $u_{2c}$ with different amplitudes and pulse widths varying in a sinusoidal fashion. The high-quality three-phase sinusoidal phase voltages $u_a$, $u_b$, $u_c$ can be obtained at the three-phase AC passive load or the high-quality three-phase sinusoidal phase currents $i_a$, $i_b$, $i_c$ can be obtained at the three-phase AC grid after three-phase filtering.

The single-stage three-phase voltage source inverter with a cascaded magnetic integrated switching inductor-capacitor network of the present disclosure is essentially different in the circuit structure of the single-phase three-phase voltage source PWM inverter or the multi-stage cascaded PWM inverter in that the present disclosure relates to a single-stage circuit structure in which two identical SLCC type two-port switching inductor-capacitor network units successively connected in cascade are used and the output of the first-stage two-port switching inductor-capacitor network unit is the input of the second-stage two-port switching inductor-capacitor network unit, thereby improving the step-up ratio of the inverter. Therefore, the single-stage three-phase inverter of the present disclosure is novel and creative, and has the advantages of high conversion efficiency (meaning low energy loss), high power density (meaning small volume and small weight), large step-up ratio (meaning that the input DC voltage with a wider or a smaller variation range can be converted into the desired three-phase output AC voltage or a three-phase output grid current), magnetic integration of three energy storage inductors, low output waveform distortion, high reliability, low cost and broad application prospects, etc. The single-stage three-phase inverter of the present disclosure is an ideal energy-saving and consumption-reduction three-phase inverter, which is of great value in today's vigorous promotion of building an energy-saving and economical society.

Figure 3:
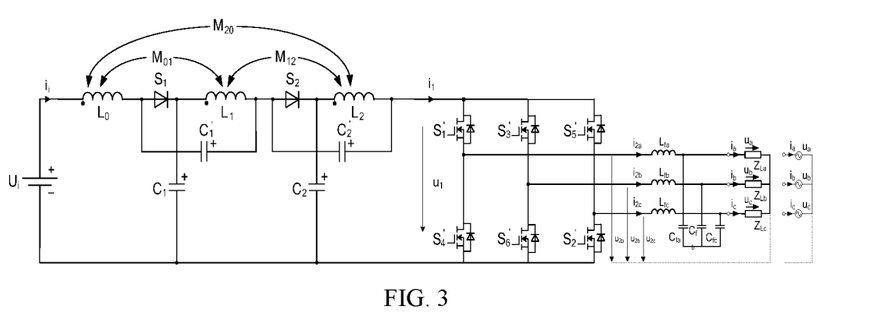
FIG. 3 shows the first embodiment of a circuit topology of the single-stage three-phase voltage source inverter with cascaded magnetic integrated switching inductor-capacitor network—the schematic diagram of a three-phase LC filter circuit.
Figure 4:
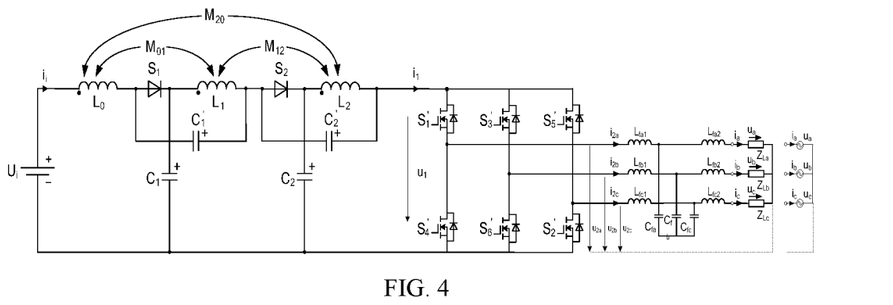
FIG. 4 shows the second embodiment of a circuit topology of the single-stage three-phase voltage source inverter with a cascaded magnetic integrated switching inductor-capacitor network—the schematic diagram of a three-phase LCL filter circuit.

Embodiments of the circuit topology of the single-stage three-phase voltage source inverter with a cascaded magnetic integrated switching inductor-capacitor network are shown in FIGS. 3 and 4. FIG. 3 is the three-phase LC filter circuit which is suitable for the occasions of inversion where high output waveform quality is required. FIG. 4 is the three-phase LCL filter circuit which is suitable for the occasions of inversion where high output waveform quality is required. In the circuit shown in FIGS. 3 and 4, the three-phase inverter bridge uses MOSFET devices. Alternatively, IGBT, GTR, or other devices may also be used. The single-stage three-phase inverter can convert unstable low-voltage direct current electricity (e.g. the electricity from the sources such as batteries, photovoltaic cells, fuel cells and wind turbines, etc.) into a desired, stable, high-quality, high-voltage three-phase sinusoidal alternating current electricity. Thus, the single-stage three-phase inverter is widely used in civil industrial inverter power sources (e.g. communication inverter and photovoltaic grid-connected inverter 24VDC/380V50HzAC, 48VDC/380V50HzAC, 96VDC/380V50HzAC), in national defense industrial inverter power sources (e.g. aviation static converter 27VDC/200V400HzAC) etc., and in medium and large capacity, step-up occasions.

Each energy storage inductor of the single-stage three-phase voltage source inverter with a cascaded magnetic integrated switching inductor-capacitor network is magnetized and demagnetized once for each in a high frequency switching cycle $T_S$. The magnetization period corresponds to the shoot-through period $D_0 T_S$ of the inverter leg and the demagnetization period corresponds to the non-shoot-through period $(1-D_0) T_S$ of the inverter leg (including the two zero vector periods except for outputting energy to the AC side and the shoot-through period of the inverter leg). The driving signals of the upper and lower transistors of the three legs of the three-phase inverter bridge are opposite. Namely, if switching on and switching off the upper transistor are represented by "1" and "0" respectively, then the three-phase inverter bridge has eight operating modes: 0 (000), 1(001), 2(010), 3(011), 4(100), 5(101), 6(110), 7(111). The two modes of 0 (000) and 7 (111) are two conventional zero vectors outside of the shoot-through period of the inverter leg and the rest of six modes 1 (001), 2 (010), 3 (011), 4 (100), 5 (101), 6 (110) are effective vectors which include all equivalent circuits in both of the positive and negative half cycles of the three-phase output voltages a, b, c. The magnetizing equivalent circuits of the energy storage inductor of the inverter during the shoot-through period $D_0 T_S$ of the inverter leg and the demagnetizing equivalent circuits corresponding to the eight modes during the non-shoot-through period $(1-D_0) T_S$ of the inverter leg are respectively shown in FIGS. 5, 6, 7, 8, 9, 10, 11, 12, 13. In the drawings, the polarity of the output voltages $u_a$, $u_b$, $u_c$ is the reference polarity, and the polarity of the currents reflects the actual current direction.

Figure 5:
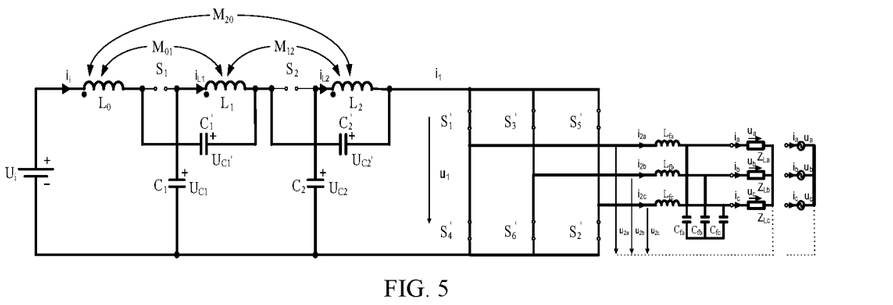
Figure 6:
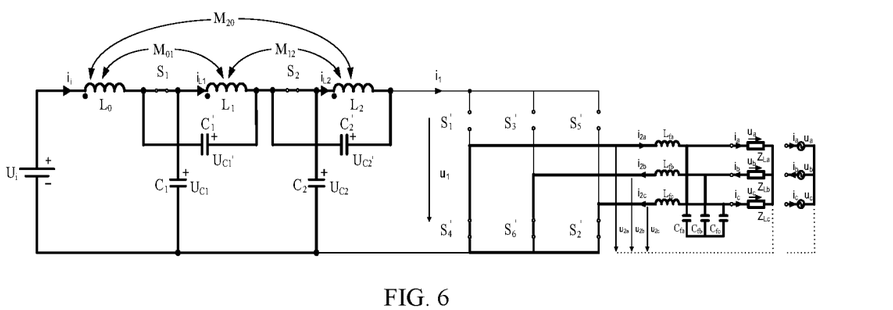
FIG. 6 shows a demagnetization equivalent circuit of the energy storage inductors of the single-stage three-phase voltage source inverter with a cascaded magnetic integrated switching inductor-capacitor network during the non-shoot-through period $(1-D_0)T_S$, mode 0 (000) of the leg—$S_4'$, $S_6'$, $S_2'$ being turned on and $S_1'$, $S_3'$, $S_5'$ being turned off.
Figure 7:
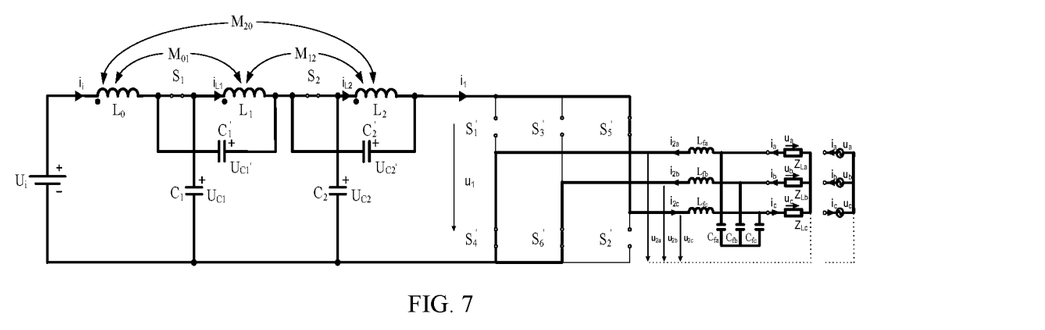
FIG. 7 shows a demagnetization equivalent circuit of the energy storage inductors of the single-stage three-phase voltage source inverter with a cascaded magnetic integrated switching inductor-capacitor network during the non-shoot-through period $(1-D_0)T_S$, mode 1(001) of the leg—$S_4'$, $S_5'$, $S_6'$ being turned on and $S_1'$, $S_2'$, $S_3'$ being turned off.
Figure 8:
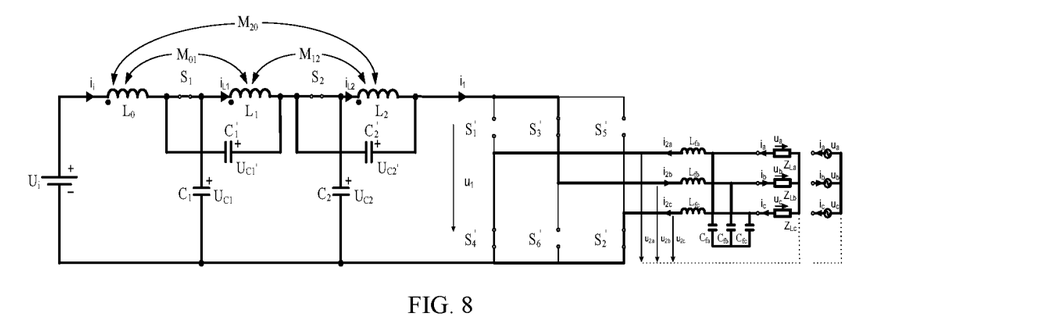
FIG. 8 shows a demagnetization equivalent circuit of the energy storage inductors of the single-stage three-phase voltage source inverter with a cascaded magnetic integrated switching inductor-capacitor network during the non-shoot-through period $(1-D_0)T_S$, mode 2 (010) of the leg—$S_2'$, $S_3'$, $S_4'$ being turned on and $S_1'$, $S_5'$, $S_6'$ being turned off.
Figure 9:
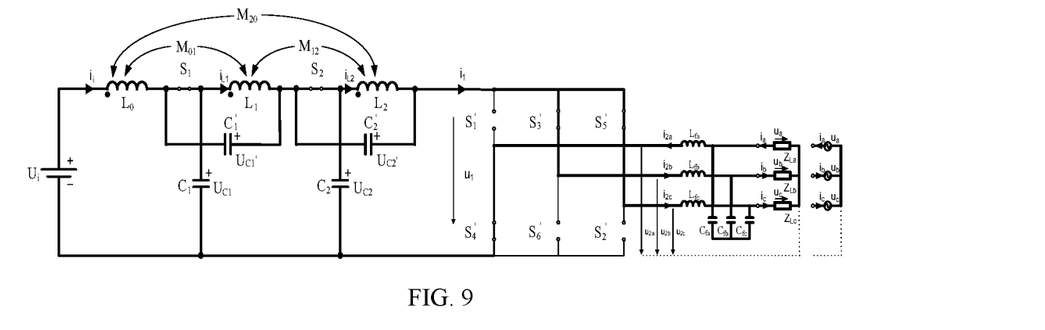
FIG. 9 shows a demagnetization equivalent circuit of the energy storage inductors of the single-stage three-phase voltage source inverter with a cascaded magnetic integrated switching inductor-capacitor network during the non-shoot-through period $(1-D_0)T_S$, mode 3 (011) of the leg—$S_3'$, $S_4'$, $S_5'$ being turned on and $S_1'$, $S_2'$, $S_6'$ being turned off.
Figure 10:
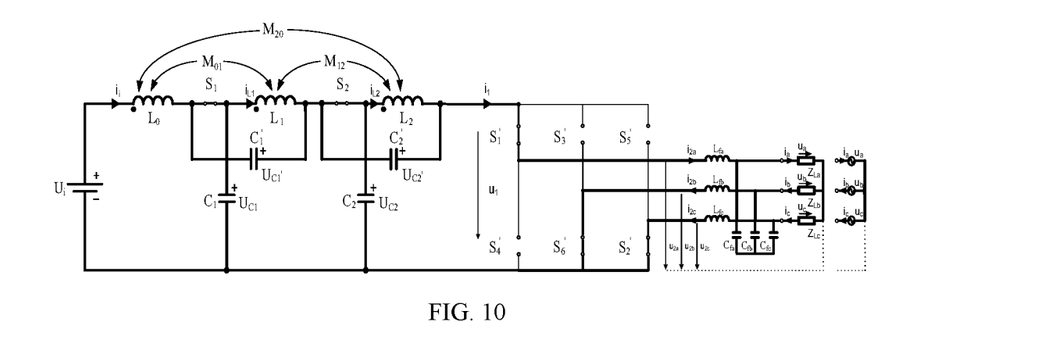
FIG. 10 shows a demagnetization equivalent circuit of the energy storage inductors of the single-stage three-phase voltage source inverter with a cascaded magnetic integrated switching inductor-capacitor network during the non-shoot-through period $(1-D_0)T_S$, mode 4 (100) of the leg—$S_1'$, $S_2'$, $S_6'$ being turned on and $S_3'$, $S_4'$, $S_5'$ being turned off.
Figure 11:
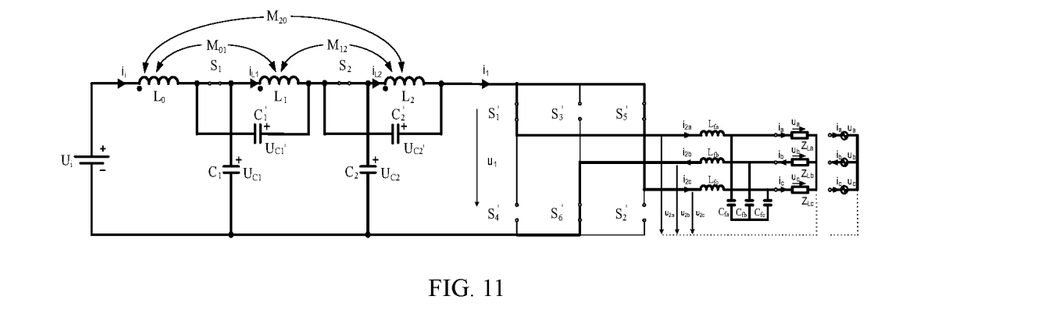
FIG. 11 shows a demagnetization equivalent circuit of the energy storage inductors of the single-stage three-phase voltage source inverter with a cascaded magnetic integrated switching inductor-capacitor network during the non-shootthrough period $(1-D_0) T_S$, mode 5 (101) of the leg—$S_1'$, $S_5'$, $S_6'$ being turned on and $S_2'$, $S_3'$, $S_4'$ being turned off.
Figure 12:
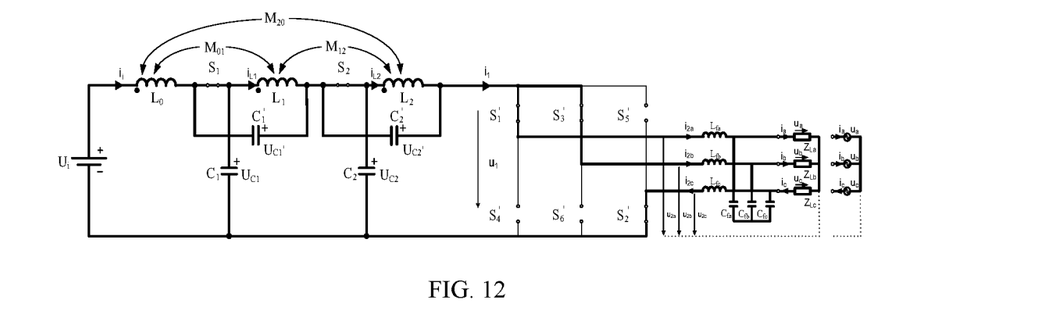
FIG. 12 shows a demagnetization equivalent circuit of the energy storage inductors of the single-stage three-phase voltage source inverter with a cascaded magnetic integrated switching inductor-capacitor network during the non-shoot-through period $(1-D_0) T_S$, mode 6 (110) of the leg—$S_1'$, $S_2'$, $S_3'$ being turned on and $S_4'$, $S_5'$, $S_6'$ being turned off.
Figure 13:
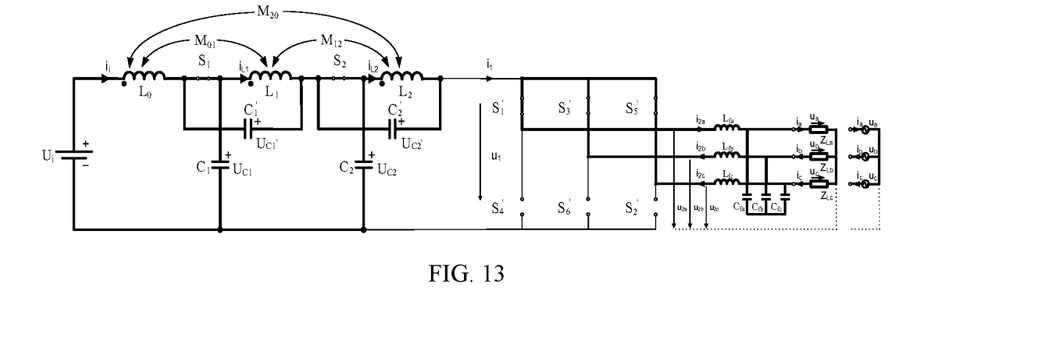
FIG. 13 shows a demagnetization equivalent circuit of the energy storage inductors of the single-stage three-phase voltage source inverter with a cascaded magnetic integrated switching inductor-capacitor network during the non-shoot-through period $(1-D_0) T_S$, mode 7(111) of the leg—$S_1'$, $S_3'$, $S_5'$ being turned on and $S_4'$, $S_6'$, $S_2'$ being turned off.

Suppose that the terminal voltages of the energy storage capacitor are constant within a high frequency switching period $T_S$, and are represented by $U_{C1}$, $U_{C2}$, $U'_{c1}$, $U'_{c2}$. The input DC power supply current $i_i$ is the current $i_{L0}$ of the energy storage inductor $L_0$. The following equations can be obtained according to the magnetizing equivalent circuit of the energy storage inductor during the shoot-through period $D_0 T_S$ of the inverter leg, shown in FIG. 5, $$-U_i + L_0 \frac{di_{L0}}{dt} + M_{01}\frac{di_{L1}}{dt} + M_{20}\frac{di_{L2}}{dt} - (U'_{C1} + U'_{C2}) = 0 \quad (1.0)$$

$$-U_{C1} + L_1 \frac{di_{L1}}{dt} + M_{01}\frac{di_{L0}}{dt} + M_{12}\frac{di_{L2}}{dt} - U'_{C2} = 0 \quad (1.1)$$

$$-U_{C2} + L_2 \frac{di_{L2}}{dt} + M_{12}\frac{di_{L1}}{dt} + M_{20}\frac{di_{L0}}{dt} = 0. \quad (1.2)$$

According to the demagnetizing equivalent circuits corresponding to the eight modes of the energy storage inductor during the non-shoot-through period $(1-D_0)\,T_S$ of the inverter leg, shown in FIGS. 6, 7, 8, 9, 10, 11, 12, 13, the following equations can be obtained, $$-U_i + L_0\frac{di_{L0}}{dt} + M_{01}\frac{di_{L1}}{dt} + M_{20}\frac{di_{L2}}{dt} + U_{C1} = 0 \quad (2.0)$$

$$L_1\frac{di_{L1}}{dt} + M_{01}\frac{di_{L0}}{dt} + M_{12}\frac{di_{L2}}{dt} + U'_{C1} = 0 \quad (2.1)$$

$$L_2\frac{di_{L2}}{dt} + M_{12}\frac{di_{L1}}{dt} + M_{20}\frac{di_{L0}}{dt} + U'_{C2} = 0. \quad (2.2)$$

Let the voltage amplitude of the DC side of the three-phase inverter bridge be $U_1$, and the following supplementary equations can be obtained, $$U_{C1} + U_{C1}' + U_{C2}' = U_1 \quad (3.1)$$

$$U_{C2} + U_{C2}' = U_1. \quad (3.2)$$

According to the state-space averaging method equation$(1) \times D_0$ + equation$(2) \times (1-D_0)$, let $\dfrac{di_{L0}}{dt} = \dfrac{di_{L1}}{dt} = \dfrac{di_{L2}}{dt} = 0,$ combined with equation (3), the voltage values $U_{C1}$, $U_{C2}$, $U'_{c1}$, $U'_{c2}$ of the energy storage capacitors in the large step-up ratio impedance network are calculated as follows, $$U_{C1} = \frac{1 - 2D_0}{1 - 3D_0} U_i \quad (4.1)$$

$$U_{C2} = \frac{1 - D_0}{1 - 3D_0} U_i \quad (4.2)$$

$$U'_{c1} = U'_{c2} = \frac{D_0}{1 - 3D_0} U_i. \quad (5)$$

The voltage amplitude $U_1$ of the DC side of the three-phase inverter bridge is $$U_1 = \frac{1}{1 - 3D_0} U_i. \quad (6)$$

In the equation (6), $3D_0<1$, i.e. $D_0<1/3$. Let the modulation coefficient of the three-phase inverter bridge be M ($0<M\le 1-D_0$), then the voltage transfer ratio (the ratios of the output phase voltages $u_a$, $u_b$, $u_c$ to the input voltage $U_i$) of the single-stage three-phase voltage source inverter with a cascaded magnetic integrated switching inductor-capacitor network is obtained below, $$\frac{u_a}{U_i} = \frac{u_a}{U_1}\frac{U_1}{U_i} = \frac{M}{2}\frac{1}{1 - 3D_0}. \quad (7)$$

According to equation (7), the voltage transfer ratio of the three-phase inverter is greater than the voltage transfer ratio M/2 of the conventional single-stage three-phase voltage source PWM inverter and there are three cases, i.e., the voltage transfer ratio is less than 1, equal to 1, and greater than 1 with different M and $D_0$ values. When $M/2>1-3D_0$, the voltage transfer ratio of the converter greater than 1 can be achieved, which shows the advantages of the present disclosure. The large step-up ratio of such a converter is achieved by increasing the number of unit stages of the magnetic integrated switching inductor-capacitor network unit.

Figure 14:
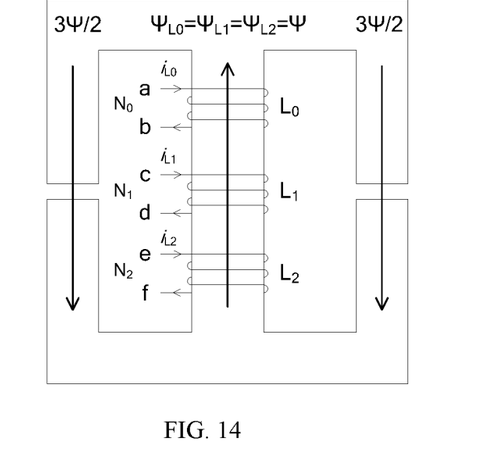
FIG. 14 shows a magnetic coupling structure of three energy storage inductors $L_0$, $L_1$, $L_2$ in the magnetic integrated switching inductor-capacitor network.
Figure 15:
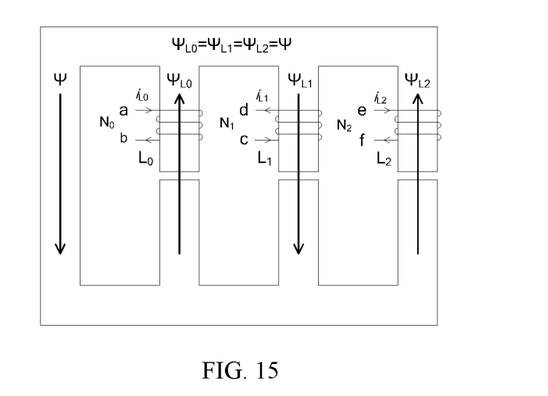
FIG. 15 shows a magnetic decoupling structure of three energy storage inductors $L_0$, $L_1$, $L_2$ in the magnetic integrated switching inductor-capacitor network.
Figure 16:
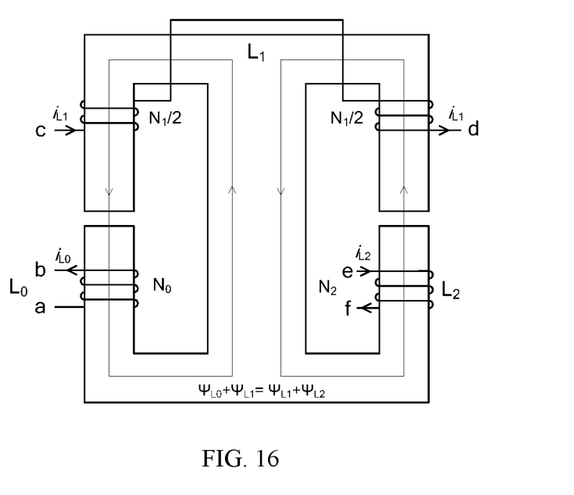
FIG. 16 shows a magnetic coupling structure in which the energy storage inductor $L_1$ is magnetically coupled to the energy storage inductors $L_0$ and $L_2$, respectively in the magnetic integrated switching inductor-capacitor network.

The magnetic integration structure of the three energy storage inductors $L_0$, $L_1$, $L_2$ in the magnetic integrated switching inductor-capacitor network shown in FIGS. 3 and 4 is configured to have a magnetic coupling of the three inductors, a magnetic decoupling of the three inductors, or a magnetic coupling of each inductor with the other two inductors, as shown in FIGS. 14, 15, 16 and Table 1.

TABLE 2 comparison of the three magnetic integration structures magnetic

| | cores attribute | | | | | |
|---|---|---|---|---|---|---|
| solution | $L_0$ alternating magnetic | $L_1$ alternating magnetic | $L_2$ alternating magnetic | structure of magnetic | loss of magnetic | cross-sectional area of magnetic |
| structure 1 | enhance | enhance | enhance | common | large | large |
| structure 2 | constant | constant | constant | special | medium | small |
| structure 3 | enhance | enhance | enhance | common | small | medium |

The magnetic coupling structure of the three energy storage inductors $L_0$, $L_1$, $L_2$ shown in FIG. 14 is realized by an EE core and the three energy storage induction coils $N_0$, $N_1$, $N_2$ are all wound around the center leg without an air gap (such as an ferrite core) or the center leg with an air gap (such as a magnetic powder core) of the magnetic core. The two side legs with air gaps of the magnetic core have no windings. The magnetic flux linkage $\Psi_{L0}$, $\Psi_{L1}$, $\Psi_{L2}$ generated by the currents $i_{L0}$, $i_{L1}$, $i_{L2}$ of the three energy storage induction coils $N_0$, $N_1$, $N_2$ are all equal to $\Psi$. The magnetic flux linkage of the center leg is $3\Psi$ and the magnetic flux linkage of the two side legs is $3\Psi/2$. The mutual inductance between the three energy storage inductors $L_0$, $L_1$, $L_2$ is $M_{01}=M_{12}=M_{20}$. The following equation can be obtained according to equations (1), (2), (4) and (5)

$$u_{ab} = u_{cd} = u_{ef} = u. \quad (8)$$

Considering the following, $$u_{ab} = L_0\frac{di_{L0}}{dt} + M_{01}\frac{di_{L1}}{dt} + M_{20}\frac{di_{L2}}{dt} \quad (9.1)$$

-continued $$u_{cd} = L_1 \frac{di_{L1}}{dt} + M_{01} \frac{di_{L0}}{dt} + M_{12} \frac{di_{L2}}{dt} \quad (9.2)$$

$$u_{ef} = L_2 \frac{di_{L2}}{dt} + M_{12} \frac{di_{L1}}{dt} + M_{20} \frac{di_{L0}}{dt}. \quad (9.3)$$

Provided that $L_0=L_1=L_2=L$, $M_{01}=M_{12}=M_{20}=M$, so $$\frac{di_{L0}}{dt} = \frac{di_{L1}}{dt} = \frac{di_{L2}}{dt} = \frac{u}{L+2M}. \quad (10)$$

The equivalent inductance is calculated as follows:

$$L_{0eq}=L_{1eq}=L_{2eq}=L+2M \quad (11)$$

Let $k_{01}=M_{01}/\sqrt{L_0 L_1}$, $k_{12}=M_{12}/\sqrt{L_1 L_2}$, $k_{20}=M_{20}/\sqrt{L_0 L_2}$, then $k_{01}=k_{12}=k_{20}=k$, so $$L_{0eq}=L_{1eq}=L_{2eq}=L(1+2k) \quad (12)$$

Since $0<k<1$, $$L_{0eq}=L_{1eq}=L_{2eq}=L(1+2k)>L. \quad (13)$$

The magnetic decoupling structure of the three energy storage inductors $L_0$, $L_1$, $L_2$ shown in FIG. 15 is realized by using a four-leg magnetic core. The three energy storage induction coils $N_0$, $N_1$, $N_2$ are respectively wound around the three legs with air gaps of the magnetic core and there is no air gap and no winding on the fourth leg of the magnetic core. The magnetic flux linkages $\Psi_{L0}$, $\Psi_{L1}$, $\Psi_{L2}$, generated by the currents $i_{L0}$, $i_{L1}$, $i_{L2}$ of the three energy storage inductors $N_0$, $N_1$, $N_2$, are all equal to $\Psi$. The magnetic flux linkages of the three legs with air gaps and the fourth leg without an air gap are all equal to $\Psi$, and the three energy storage inductors $L_0$, $L_1$, $L_2$ are magnetically decoupled, i.e. the mutual inductance between the three energy storage inductors $M_{01}=M_{12}=M_{20}=0$. Therefore, the inductance is constant and the equivalent inductances of the three energy storage inductors are still $L_0$, $L_1$, $L_2$, respectively.

The magnetic coupling structure between the energy storage inductor $L_1$ shown in FIG. 16 and the energy storage inductor $L_0$, $L_2$ respectively are realized by using an EE core. One half of the energy storage induction coil $N_1$ and the energy storage induction coil $N_0$ are wound around a side leg with an air gap of the magnetic core. The other half of the energy storage induction coil $N_1$ and the energy storage induction coil $N_2$ are wound around another side leg with an air gap of the magnetic core and there is no winding on the center leg without an air gap of the magnetic core (e.g. an ferrite core) or no winding on the center leg with an air gap of the magnetic core (e.g. an magnetic powder core). The magnetic flux linkages $\Psi_{L0}$, $\Psi_{L1}$, $\Psi_{L2}$ are generated by the currents $i_{L0}$, $i_{L1}$, $i_{L2}$ of the three energy storage induction coils $N_0$, $N_1$, $N_2$. The magnetic flux linkage $\Psi_{L0}+\Psi_{L1}$ on the two side legs with air gaps is equal to $\Psi_{L1}+\Psi_{L2}$. The magnetic flux linkage on the center leg is zero and the mutual inductance between the three energy storage inductors $L_0$, $L_1$, $L_2$ is $M_{01}=M_{12}>>M_{20}$. For the magnetic core, such as a ferrite core without an air gap on the center leg, $M_{20}\approx 0$. According to equations (8) and (9), considering $L_0=L_2$, $M_{01}=M_{12}$, then $$\frac{di_{L0}}{dt} = \frac{di_{L2}}{dt},$$

the following equations can be obtained after simplification $$u = (L_0 + M_{20})\frac{di_{L0}}{dt} + M_{01}\frac{di_{L1}}{dt} \quad (14.1)$$

$$u = L_1 \frac{di_{L1}}{dt} + 2M_{01}\frac{di_{L0}}{dt}. \quad (14.2)$$

Accordingly, we have $$\frac{di_{L0}}{dt} = \frac{di_{L2}}{dt} = \frac{u(L_1 - M_{01})}{(L_0 + M_{20})L_1 - 2M_{01}^2} \quad (15.1)$$

$$\frac{di_{L1}}{dt} = \frac{u((L_0 + M_{20}) - 2M_{01})}{(L_0 + M_{20})L_1 - 2M_{01}^2}. \quad (15.2)$$

The equivalent inductances of the three energy storage inductors $L_0$, $L_1$, $L_2$ are shown below, $$L_{0eq} = L_{2eq} = \frac{(L_0 + M_{20})L_1 - 2M_{01}^2}{L_1 - M_{01}} \quad (16.1)$$

$$L_{1eq} = \frac{(L_0 + M_{20})L_1 - 2M_{01}^2}{L_0 + M_{20} - 2M_{01}}. \quad (16.2)$$

Let the coupling coefficients $k_{01}=M_{01}/\sqrt{L_0 L_1}$, $k_{12}=M_{12}/\sqrt{L_1 L_2}$, $k_{20}=M_{20}/\sqrt{L_0 L_2}$ then $$L_{0eq} = L_{2eq} = \frac{(L_0 + k_{20}\sqrt{L_0 L_2})L_1 - 2k_{01}^2 L_0 L_1}{L_1 - k_{01}\sqrt{L_0 L_1}} \quad (17.1)$$

$$L_{1eq} = \frac{(L_0 + k_{20}\sqrt{L_0 L_2})L_1 - 2k_{01}^2 L_0 L_1}{L_0 + k_{20}\sqrt{L_0 L_2} - 2k_{01}\sqrt{L_0 L_1}}. \quad (17.2)$$

Let equation (17.1)>$L_0$, equation (17.2)>$L_1$, we have $$k_{01} < \frac{\sqrt{L_0/L_1} + \sqrt{L_0/L_1 + 8k_{20}\sqrt{L_2/L_0}}}{4} \quad (18.1)$$

$$k_{01} < \sqrt{L_1/L_0}. \quad (18.2)$$

Therefore, the value range of $k_{01}$ is $$0 < k_{01} < \min\left\{\frac{\sqrt{L_0/L_1} + \sqrt{L_0/L_1 + 8k_{20}\sqrt{L_2/L_0}}}{4}, \sqrt{L_1/L_0}\right\}. \quad (19)$$

When $M_{20}=0$, i.e. $k_{20}=0$ $$L_{0eq} = L_{2eq} = L_0 \frac{1 - 2k_{01}^2}{1 - k_{01}\sqrt{L_0/L_1}} \quad (20.1)$$

$$L_{1eq} = L_1 \frac{1 - 2k_{01}^2}{1 - 2k_{01}\sqrt{L_1/L_0}} \quad (20.2)$$

-continued $$0 < k_{01} < \min\left\{\frac{\sqrt{L_0/L_1}}{2}, \sqrt{L_1/L_0}\right\}. \quad (20.3)$$

If $N_0 = N_1 = N_2$, i.e. $L_0 = L_2 = 2L_1$, then $$L_{0eq} = L_{2eq} = L_0(1 + \sqrt{2}\,k_{01}) \quad (21.1)$$

$$L_{1eq} = L_1(1 + \sqrt{2}\,k_{01}). \quad (21.2)$$

Figure 17:
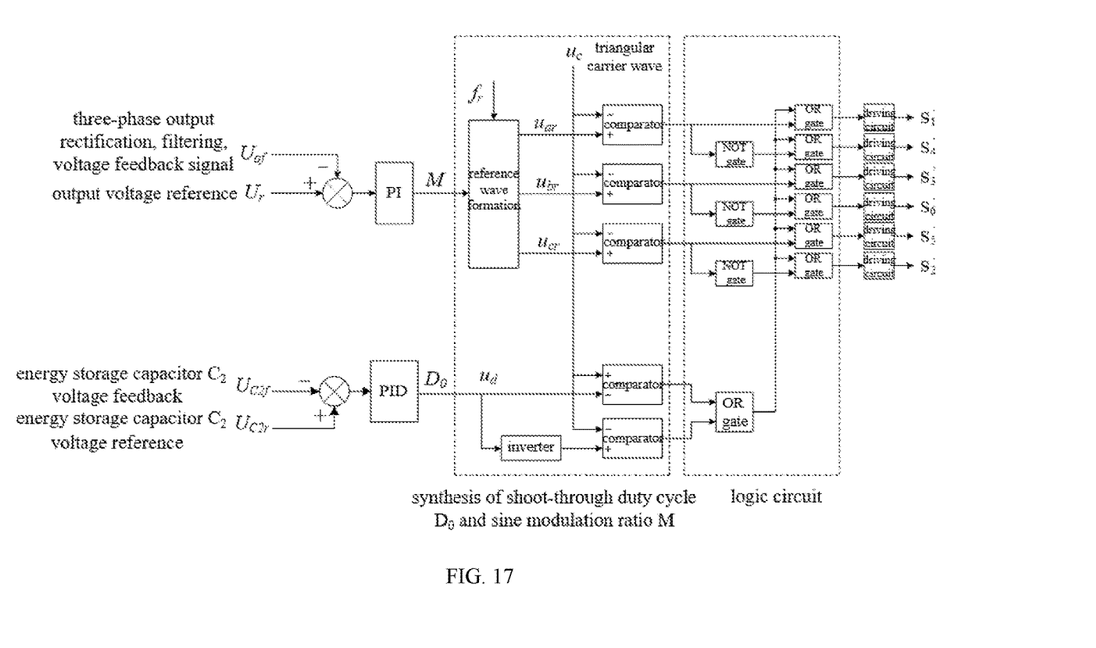
FIG. 17 is a block diagram according to the control principle of the single-stage three-phase voltage source inverter with a cascaded magnetic integrated switching inductor-capacitor network.
Figure 18:
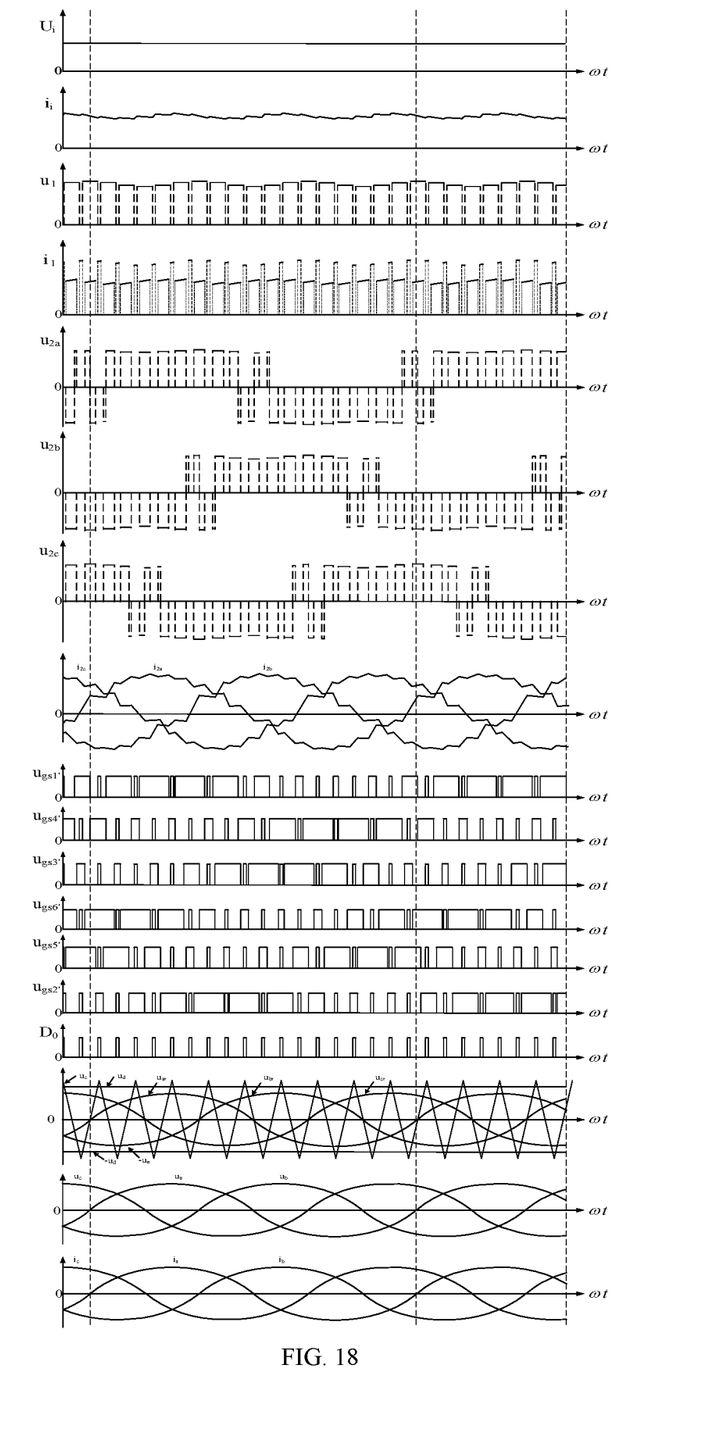
FIG. 18 shows the waveforms according to the control principle of the single-stage three-phase voltage source inverter with a cascaded magnetic integrated switching inductor-capacitor network.

The single-stage three-phase voltage source inverter with a cascaded magnetic integrated switching inductor-capacitor network only has a single-stage power conversion, and the control system thereof needs to realize the control of the voltage of the energy storage capacitor and the output voltage (grid-connected current) of the magnetic integrated switching inductor-capacitor network. When the photovoltaic cell supplies power, it is also necessary to realize the control of the maximum power point tracking (MPPT) of the photovoltaic cell. Therefore, the three-phase inverter adopts a three-phase output voltage or a three-phase grid-connected current instantaneous value rectification, filtering, feedback SPWM control strategy which can provide feedforward control for the energy storage capacitor voltage of the magnetic integrated switching inductor-capacitor network, as shown in FIGS. 17 and 18. The three-phase output voltage or three-phase grid-connected current instantaneous value rectification, filtering, feedback SPWM control strategy is used to adjust the modulation ratio M of the conversion system, while the feedforward control strategy of the energy storage capacitor voltage $U_{C2}$ of the magnetic integrated switching inductor-capacitor network is used to adjust the shoot-through duty cycle $D_0$ of the conversion system. The three-phase output voltage or the three-phase grid-connected current instantaneous value rectification, filtering, feedback signal $U_{of}$ is compared with the reference voltage $U_r$, and the error is amplified to obtain a signal for controlling the amplitude of the three-phase reference sine wave $u_{ar}$, $u_{br}$, $u_{cr}$ (characterizing the sine modulation ratio signal M). The voltage feedback signal $U_{C2f}$ of the energy storage capacitor is compared with the voltage reference signal $U_{C2r}$ of the energy storage capacitor, and the error is amplified to obtained signal $u_d$ (characterizing the shoot-through duty cycle signal $D_0$). Signals $u_{ar}$, $u_{br}$, $u_{cr}$, $u_d$ and the reversed-phase signals thereof respectively intersect with the triangular carrier wave $u_c$ and output the control signals of the three-phase inverter bridges $S_1'$, $S_3'$, $S_5'$, $S_4'$, $S_6'$, $S_2'$ after passing through an appropriate logic circuit. When the input voltage $U_i$ changes, the voltage $U_{C2}$ of energy storage capacitor is stabilized by adjusting the shoot-through duty cycle signal $D_0$. When the output load $Z_L$ changes, the output voltage $u_o$ is stabilized by adjusting the sine modulation ratio signal M. Therefore, it is feasible for the single-stage three-phase inverter to adopt a three-phase output voltage or a three-phase grid-connected current instantaneous value rectification, filtering, feedback SPWM control strategy which can provide feedforward control for the energy storage capacitor voltage of the impedance network with a large step-up ratio.

What is claimed is:

1. A circuit structure of a single-stage three-phase voltage source inverter with a cascaded magnetic integrated switching inductor-capacitor network, comprising: an input DC power supply, a magnetic integrated switching inductor-capacitor network, a three-phase inverter bridge, a three-phase filter, and a three-phase AC load or a three-phase AC grid; wherein the input DC power supply, the magnetic integrated switching Inductor-capacitor network, the three-phase inverter bridge, the three-phase filter, and the three-phase AC load or the three-phase AC grid are connected in cascade; the magnetic: integrated switching inductor-capacitor network comprises an energy storage inductor (Lo) and two identical switching-inductor-capacitor-capacitor (SLCC) two-port switching inductor-capacitor network units, wherein each of the two identical SLCC type two-port switching inductor-capacitor network units are designated as jth SLCC, wherein j=1 or 2, the two identical SLCC two-port switching inductor-capacitor network units are connected in cascade and connected to the energy storage inductor Lo in series; each SLCC two-port switching inductor-capacitor network unit of the two identical SLCC two-port switching inductor-capacitor network units comprises a power diode (Sj), an energy storage Inductor (Lj), and two energy storage capacitors (Cj) and (Cj'), a cathode of the power diode (Sj) is connected to a first end of the energy storage inductor (Lj) and a positive electrode of the energy storage capacitor (C), a second end of the energy storage inductor (Lj) and an anode of the power diode (Sj) are respectively connected to a positive electrode and a negative electrode of the energy storage capacitor (Cj'), a negative electrode of the energy storage capacitor (Cj) is connected to a negative electrode of the input DC power supply to form a common end, a connection end of the power diode (Sj) and the energy storage capacitor (Cj') and the common end of the energy storage capacitor (Cj) constitute an input port of a jai SLCC type two-port switching inductor-capacitor network unit, a connection end of the energy storage inductor (Lj) and the energy storage capacitor (Cj') and the common end of the energy storage capacitor (Cj) constitute an output port of the jt SLCC two-port switching inductor-capacitor network unit, the energy storage inductor (Lo) is serially connected between the connection end of a power diode (Si) and an energy storage capacitor (Ci') and a positive electrode of the input DC power supply, the three-phase inverter bridge comprises six two-quadrant power switches configured to withstand a unidirectional voltage stress and a bidirectional current stress; a magnetic integration structure of the three energy storage inductors (Lo), (Li), (L₂) in the magnetic integrated switching inductor-capacitor network is configured to have a magnetic coupling structure of the three energy storage inductors, a magnetic decoupling structure of the three energy storage inductors, or a magnetic coupling structure of each energy storage inductor with the other two energy storage inductors, mutual inductances between each two of the three energy storage inductors (Lo), (Li), (L₂) are represented by (Moi), (Mi2), (M₂₀), respectively.

2. The circuit structure of the single-stage three-phase voltage source inverter with the cascaded magnetic integrated switching inductor-capacitor network of claim 1, further comprising: a first EE magnetic core is configured to achieve the magnetic coupling structure of the three energy storage inductors, three energy storage induction coils are all wound around a center leg without or with air gaps of the first EE magnetic core, and there is no winding on two side legs with the air gaps of the first EE magnetic core, magnetic flux linkages ('P$_{LO}$), ('P$_L$1), ('PL2) generated by currents (i$_{LO}$), (iL1), (iL2) of the three energy storage induction coils (No), (Ni), (N₂) are all equal to 'P, a magnetic flux linkage of the center leg is 3 W, a magnetic flux linkage of the two side legs is 3 W/2, the three energy storage inductors (Lo)=(L₁)=(L₂)=1, and the mutual inductances between each two of the three energy storage inductors are (Mo1)=(M₁₂)=(M₂₀)=M, and coupling coefficients are koi=Moi/(Lo $Li)^{1/2}>ki_2=Mi_2/(Li\ L_2)^{1/2}>k_2o=M_2o/(Lo\ L_2)^{1/2}$ $koi=ki_2=k_2o=k$, $0<k<1$, equivalent inductances of the three energy storage inductors are $Lo_{eq}=Li_{eq}=L_{2eq}=L(1+2k)$.

3. The circuit structure of the single-stage three-phase voltage source inverter with the cascaded magnetic integrated switching inductor-capacitor network of claim 1, further comprising: a four-leg magnetic core configured to achieve the magnetic decoupling structure of the three energy storage inductors, and the three energy storage induction coils are respectively wound around three legs with the air gaps of the four-leg magnetic core, and a fourth leg of the four-leg magnetic core has no air gap and no winding, the magnetic flux linkages ('P$_{to}$), ('I$_{L1}$), (WL2) generated by the currents (iLo), (IL1), (iL2) of the three energy storage inductors (No), (Ni), (N$_2$) are all equal to 'P, magnetic flux linkages of the three legs with the air gaps and the fourth leg without the air gaps are all equal to 'P, the three energy storage inductors (Lo), (Li), (L$_2$) are magnetically decoupled, and the mutual inductances between each two of the three energy storage inductors are (Moi)=(Mi$_2$)=(M$_{2o}$)=0, the equivalent inductances of the three energy storage inductors are still (Lo), (Li), (L$_2$), respectively.

4. The circuit structure of the single-stage three-phase voltage source inverter with the cascaded magnetic integrated switching inductor-capacitor network of claim 1, further comprising: a second EE magnetic core is configured to achieve the magnetic coupling structure of the energy storage inductor (Li) with the other two energy storage inductors (Lo), (L$_2$), and a first half of the energy storage induction coil (Ni) and the energy storage induction coil (No) are wound around a first side leg with the air gaps of the second EE magnetic core, a second half of the energy storage induction coil (Ni) and the energy storage induction coil (N$_2$) are wound around a second side leg with the air gaps of the second EE magnetic core, and there is no winding on the center leg without or with the air gaps of the second EE magnetic core, the magnetic flux linkages ('PLO), ('IL1), ('PL2) are generated by the currents (iLo), (iL1), (iL2) of the three energy storage induction coils (No), (Ni), (N$_2$), the magnetic flux linkage ('PLo)+(TL1) on the two side legs with the air gaps is equal to (W$_L$1)+Q(($_{L2}$), the magnetic flux linkage on the center leg is zero, and the mutual inductances between each two of the three energy storage inductors (Lo), (Li), (L$_2$) are (Moi)=(Mi$_2$)>>(M$_2$0), (Lo)=(L$_2$), the EE magnetic core such as a ferrite core having the center leg without the air gaps, (M$_{2O}$)=0, the coupling coefficients $koi=Moi/(LoLi)^{1/2}$, $ki2=Mi2/(LiL2)^{1/2}$, $k2o=M2o/(LoL2)^{1/2}$, equivalent inductances of the three energy storage inductors are $$Loeq=L2eq=((Lo+k2o(LoL2)^{1/2})Li-2(koi)^2L0L1)/(Li-koi(LoLi)^{1/2}),$$

$$Lieq=((Lo+k2o(LoL2)^{1/2})Li-2(koi)^2L0L1)/(Lo+k2o(LoL2)^{1/2}-2(koi)(LoLi)^{1/2}, \text{when } Loeq=L2eq>(Lo) \text{ and } Li_{eq}>(Li),$$

$$0<koi<\min\{((Lo/Li)^{1/2}+(L_0/Li+8k_{20}(L_2/L_0)^{1/2})^{1/2})/4, (Li/L_0)^{1/2}\}.$$

* * * * *